(12) United States Patent
Meyer et al.

(10) Patent No.: US 9,828,463 B2
(45) Date of Patent: Nov. 28, 2017

(54) PROCESS FOR PREPARING POLYSILOXANE-POLYCARBONATE BLOCK COCONDENSATES USING A SALT OF A WEAK ACID

(71) Applicant: Covestro Deutschland AG, Leverkusen (DE)

(72) Inventors: Alexander Meyer, Düsseldorf (DE); Klaus Horn, Dormagen (DE); Thomas Pfingst, Tönisvorst (DE); Sebastian Wetzel, Schwelm (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/027,770

(22) PCT Filed: Oct. 6, 2014

(86) PCT No.: PCT/EP2014/071287
§ 371 (c)(1),
(2) Date: Apr. 7, 2016

(87) PCT Pub. No.: WO2015/052106
PCT Pub. Date: Apr. 16, 2015

(65) Prior Publication Data
US 2016/0244561 A1 Aug. 25, 2016

(30) Foreign Application Priority Data
Oct. 8, 2013 (EP) .................................... 13187745

(51) Int. Cl.
*C08G 64/18* (2006.01)
*C08G 77/448* (2006.01)

(52) U.S. Cl.
CPC ......... *C08G 64/186* (2013.01); *C08G 77/448* (2013.01)

(58) Field of Classification Search
CPC .......................... C08G 64/186; C08G 77/448
See application file for complete search history.

(56) References Cited

U.S. PATENT DOCUMENTS

| | | | |
|---|---|---|---|
| 3,189,662 A | 6/1965 | Vaughn, Jr. | |
| 3,419,634 A | 12/1968 | Vaughn, Jr. | |
| 4,066,618 A * | 1/1978 | Mark | C08K 5/098 524/395 |
| 4,584,360 A | 4/1986 | Paul et al. | |
| 4,707,393 A | 11/1987 | Vetter | |
| 4,757,103 A * | 7/1988 | Dozzi | C08K 5/098 524/102 |
| 4,982,014 A | 1/1991 | Freitag et al. | |
| 5,104,723 A | 4/1992 | Freitag et al. | |
| 5,227,449 A | 7/1993 | Odell et al. | |
| 5,288,778 A | 2/1994 | Schmitter et al. | |
| 5,344,908 A | 9/1994 | Rosenquist | |
| 5,414,054 A | 5/1995 | Jonsson et al. | |
| 5,504,177 A | 4/1996 | King, Jr. et al. | |
| 5,783,651 A | 7/1998 | König et al. | |
| 5,821,321 A | 10/1998 | Archey et al. | |
| 5,821,380 A | 10/1998 | Holderbaum et al. | |
| 5,846,659 A | 12/1998 | Löwer et al. | |
| 5,883,165 A | 3/1999 | Kröhnke et al. | |
| 6,066,700 A | 5/2000 | König et al. | |
| 8,044,122 B2 | 10/2011 | Ruediger et al. | |
| 8,158,745 B2 | 4/2012 | Wehrmann et al. | |
| 2012/0252961 A1* | 10/2012 | Sybert | C08J 9/0061 524/537 |
| 2013/0267665 A1* | 10/2013 | Huggins | C08G 77/04 525/446 |
| 2016/0244558 A1* | 8/2016 | Meyer | C08G 77/448 |
| 2016/0244559 A1* | 8/2016 | Meyer | C08G 77/448 |
| 2016/0244560 A1* | 8/2016 | Meyer | C08G 77/448 |
| 2017/0009021 A1* | 1/2017 | Meyer | C08G 64/186 |

FOREIGN PATENT DOCUMENTS

| | | |
|---|---|---|
| DE | 3334782 A1 | 10/1984 |
| DE | 3832396 A1 | 2/1990 |
| DE | 38 33 953 A1 | 4/1990 |
| DE | 19710081 A1 | 9/1998 |
| DE | 10311063 A1 | 9/2004 |
| DE | 102007011069 A1 | 9/2008 |
| DE | 102008019503 A1 | 10/2009 |
| EP | 0 110 238 A2 | 6/1984 |
| EP | 0110221 A2 | 6/1984 |
| EP | 122 535 A2 | 10/1984 |
| EP | 0 500 496 A1 | 8/1992 |
| EP | 0 716 919 A2 | 6/1996 |
| EP | 0745634 A1 | 12/1996 |
| EP | 770636 A2 | 5/1997 |
| EP | 0839623 A1 | 5/1998 |
| EP | 1308084 A1 | 5/2003 |
| FR | 1561518 A | 3/1969 |
| GB | 1229482 A | 4/1971 |
| WO | WO-96/15102 A2 | 5/1996 |

OTHER PUBLICATIONS

International Search Report for PCT/EP2014/071287 dated Jul. 21, 2015.

* cited by examiner

*Primary Examiner* — David Buttner
(74) *Attorney, Agent, or Firm* — Drinker Biddle & Reath LLP

(57) ABSTRACT

The present invention relates to a process for preparing polysiloxane-polycarbonate block cocondensates proceeding from specific polycarbonates and hydroxyaryl-terminated polysiloxanes in presence of a salt of a weak acid.

12 Claims, No Drawings

PROCESS FOR PREPARING POLYSILOXANE-POLYCARBONATE BLOCK COCONDENSATES USING A SALT OF A WEAK ACID

CROSS-REFERENCE TO RELATED APPLICATIONS

This application is a national stage application (under 35 U.S.C. §371) of PCT/EP2014/071287, filed Oct. 6, 2014, which claims benefit of European Application No. 13187745.8, filed Oct. 8, 2013, both of which are incorporated herein by reference in their entirety.

The present invention relates to a process for preparing polysiloxane-polycarbonate block cocondensates proceeding from specific polycarbonates and hydroxyaryl-terminated polysiloxanes in presence of a salt of a weak acid.

The invention further relates to the polysiloxane-polycarbonate block cocondensates which have been obtained by the process according to the invention, and to the use of these cocondensates in injection moulding and extrusion applications.

BACKGROUND OF THE INVENTION

It is known that polysiloxane-polycarbonate block cocondensates have good properties with regard to low-temperature impact strength or low-temperature notched impact strength, chemical resistance and outdoor weathering resistance, and to ageing properties and flame retardancy. In terms of these properties, they are in some cases superior to the conventional polycarbonates (homopolycarbonate based on bisphenol A).

The industrial preparation of these cocondensates proceeds from the monomers, usually via the interfacial process with phosgene. Also known is the preparation of these siloxane cocondensates via the melt transesterification process using diphenyl carbonate. However, these processes have the disadvantage that the industrial plants used therefor are used for preparation of standard polycarbonate and therefore have a high plant size. The preparation of specific block cocondensates in these plants is often economically unviable because of the smaller volume of these products. Moreover, the feedstocks required for preparation of the cocondensates, for example polydimethylsiloxanes, impair the plant, since they can lead to soiling of the plant or of the solvent circuits. In addition, toxic feedstocks such as phosgene are required for the preparation, or these processes entail a high energy demand.

The preparation of polysiloxane-polycarbonate block copolymers via the interfacial process is known from the literature and is described, for example, in U.S. Pat. No. 3,189,662, U.S. Pat. No. 3,419,634, DE-B 3 34 782 and EP 122 535.

The preparation of polysiloxane carbonate block copolymers by the melt transesterification process from bisphenol, diaryl carbonate and silanol end-terminated polysiloxanes in the presence of a catalyst is described in U.S. Pat. No. 5,227,449. The siloxane compounds used are polydiphenyl- or polydimethylsiloxane telomers with silanol end groups. It is known, however, that such dimethylsiloxanes having silanol end groups, in contrast to diphenylsiloxane with silanol end groups, have an increasing tendency to self-condensation with decreasing chain length in an acidic or basic medium, such that incorporation into the copolymer as it forms is made more difficult as a result. Cyclic siloxanes formed in this process remain in the polymer and have an exceptionally disruptive effect in applications in the electrical/electronics sector.

U.S. Pat. No. 5,504,177 describes the preparation of a block copolysiloxane carbonate via inch transesterification from a carbonate-terminated silicone with bisphenol and diaryl carbonate. Because of the great incompatibility of the siloxanes with bisphenol and diaryl carbonate, homogeneous incorporation of the siloxanes into the polycarbonate matrix can be achieved only with very great difficulty, if at all, via the melt transesterification process. Furthermore, the preparation of the block cocondensates proceeding from the monomers is very demanding.

EP 770636 describes a melt transesterification process for preparation of block copolysiloxane carbonates proceeding from bisphenol A and diaryl carbonate using specific catalysts. A drawback of this process is likewise the demanding synthesis of the copolymer proceeding from the monomers.

U.S. Pat. No. 5,344,908 describes the preparation of a silicone-polycarbonate block copolymer via a two-stage process in which an OH-terminated BPA oligocarbonate prepared via a melt transesterification process is reacted with a chlorine-terminated polyorganosiloxane in the presence of an organic solvent and of an acid scavenger. Such two-stage processes are likewise very demanding and can be performed only with difficulty in industrial scale plants.

Disadvantages of all these processes are the use of organic solvents in at least one step of the synthesis of the silicone-polycarbonate block copolymers, the use of phosgene as a feedstock and/or the inadequate quality of the cocondensate. More particularly, the synthesis of the cocondensates proceeding from the monomers is very demanding, both in the interfacial process and particularly in the melt transesterification process. For example, in the case of the melt process, a small relative underpressure and low temperatures have to be employed, in order to prevent vaporization and hence removal of the monomers. Only in later reaction stages in which oligomers with higher molar mass have formed can lower pressures and higher temperatures be employed. This means that the reaction has to be conducted over several stages and that the reaction times are accordingly long.

In order to avoid the above-described disadvantages, there are also known processes which proceed from commercial polycarbonates. This is described, for example, in U.S. Pat. No. 5,414,054 and U.S. Pat. No. 5,821,321. Here, a conventional polycarbonate is reacted with a specific polydimethylsiloxane in a reactive extrusion process. A disadvantage of these processes is the use of highly active transesterification catalysts which enable the preparation of the cocondensates within short residence times in an extruder. These transesterification catalysts remain in the product and can be inactivated only inadequately, if at all. Therefore, injection mouldings made from the cocondensates thus prepared have inadequate ageing characteristics, more particularly inadequate thermal ageing characteristics. Moreover, it is necessary to use specific and hence expensive siloxane blocks.

DE 19710081 describes a process for preparing the cocondensates mentioned in a melt transesterification process proceeding from an oligocarbonate and a specific hydroxyarylsiloxane. However, the industrial scale preparation of oligocarbonates for preparation of relatively small-volume specific cocondensates is very costly and inconvenient. These oligocarbonates have relatively low molecular weights and relatively high OH end group concentrations. Frequently, these oligocarbonates, because of their short chain length, have phenolic OH concentrations above 1000 ppm. Such products are not normally commercially available and would therefore have to be produced specifically for the preparation of the cocondensates. However, it is uneconomic to operate industrial scale plants with the production of small-volume precursors. Moreover, such precursors, because of the impurities present in these products, for example residual solvents, residual catalysts, unreacted monomers etc., are much more reactive than high molecular weight commercial products based on polycarbonate. For these reasons, corresponding precursors or aromatic oligocarbonates suitable fir the preparation of such block cocondensates are commercially unavailable. Moreover, the process described in DE 19710081 does not allow preparation of block cocondensate within short reaction times. Both the preparation of the oligocarbonate and the preparation of the block cocondensate are effected over several stages with residence times totalling well over one hour. Furthermore, the resulting material is unsuitable for the preparation of cocondensates, since the high concentration of OH end groups and other impurities, for example catalyst residue constituents, lead to a poor colour in the end product.

None of the abovementioned applications describes a process which proceeds from conventional polycarbonates commercially available in principle and affords polysiloxane-polycarbonate block cocondensates in high quality.

High quality in this context means that the cocondensates can be processed in injection moulding or by extrusion processes and have a solution viscosity of preferably at least 1.26, more preferably at least 1.27, especially preferably at least 1.28, determined in dichloromethane at a concentration of 5 g/l at 25° C. using a Ubbelohde viscosimeter. Furthermore, the corresponding products must have a high melt stability. In addition, the products should not have any discoloration such as browning or yellowing.

Commercially available polycarbonates have only low reactivity and, in contrast to the above-described oligocarbonates or polycarbonate precursors, are very melt-stable. In other words, they can be compounded under the customary processing conditions or can be processed in injection moulding or in extrusion without restriction and without any change in the properties. The person skilled in the art thus assumes that these polycarbonates, which may also contain stabilizers or quenchers, are unsuitable for preparation of copolymers because of their high stability.

BRIEF SUMMARY OF THE INVENTION

Proceeding from the prior art outlined, the problem addressed was therefore that of developing an inexpensive process for the preparation of the cocondensates mentioned, which does not require toxic feedstocks such as phosgene. A further objective was to avoid preparation of such cocondensates from the monomers, i.e. proceeding from the low molecular weight bisphenols and organic carbonates such as diphenyl carbonate, since this is very demanding and requires a costly standard polycarbonate synthesis or copolycarbonate synthesis in a corresponding industrial scale plant. Instead, the process according to the invention is to enable the preparation of the cocondensates proceeding from polycarbonates commercially available in principle. Such processes are, for example, transesterification processes described in principle in the literature for example in U.S. Pat. No. 5,414,054. However, there is no known process which affords the cocondensates in comparable quality to that in the interfacial process. A further problem addressed was therefore that of developing a process which affords polysiloxane-polycarbonate block cocondenates in high quality, such that the materials are suitable for injection moulding and extrusion applications. Furthermore, the process is to afford the block copolymer within a short reaction time. Typically, the formation of polycarbonates by the melt transesterification process proceeds in several stages with high residence times (for example greater than one hour until the respective target viscosity has been attained). In contrast, the block copolymer is to be prepared in the appropriate target viscosity within short reaction times.

Moreover, inexpensively preparable siloxane components are to be used for preparation of block cocondensates. Frequently, several reaction stages, some under platinum or ruthenium catalysis, are needed for preparation of the siloxane blocks. This considerably increases the costs of preparation of these siloxane blocks and leads to discoloration in the polysiloxane-polycarbonate block cocondensate product. Therefore, in the process according to the invention, the intention is to use siloxane blocks which do not have to be prepared via processes which entail ruthenium and/or platinum catalysis and which do not contain impurities that could be detrimental to the properties of the resulting cocondensate product. Such unwanted impurities could be for example strong bases in general, salts of hydroxy- or halogen ions amines and heavy metals.

It has been possible, surprisingly, to develop a process in which commercial polycarbonates and specific hydroxyaryl-terminated polysiloxanes can be converted to high-quality polysiloxane-polycarbonate block cocondensates. It has been found that, surprisingly, the reaction can be accelerated by using an organic or inorganic salt of a weak acid. The process according to the invention further has the advantage of requiring no solvents and fewer or no subsequent purification steps compared to the processes of the prior art.

DETAILED DESCRIPTION OF THE INVENTION

The present invention therefore provides a process for preparing polysiloxane-polycarbonate block cocondensates, in which at least one hydroxyaryl-terminated siloxane of the formula (1) (siloxane component)

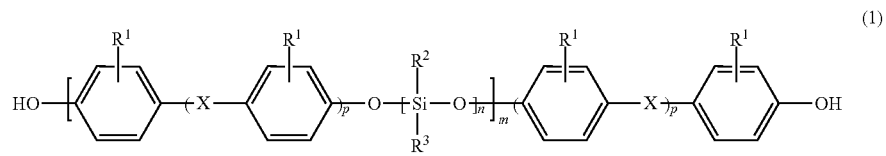

in which $R^1$ is H, Cl, Br or $C_1$ to $C_4$-alkyl, preferably H or methyl, and especially preferably H, $R^2$ and $R^3$ are the same or different and each independently from one another selected from aryl, $C_1$ to $C_{10}$-alkyl and $C_1$ to $C_{10}$-alkylaryl, preferably $R^2$ and $R^3$ are methyl, X is a single bond, —CO—, —O—, $C_1$- to $C_6$-alkylene, $C_2$ to $C_5$-alkylidene, $C_5$ to $C_{12}$-cycloalkylidene or $C_6$ to $C_{12}$-arylene which may optionally be fused to further aromatic rings containing heteroatoms, X preferably being a single bond, $C_1$ to $C_5$-alkylene, $C_2$ to $C_5$-alkylidene, $C_5$ to $C_{12}$-cycloalkylidene, —O— or —CO—, X more preferably being a single bond, isopropylidene, $C_5$- to $C_{12}$-cycloalkylidene or oxygen, and most preferably isopropylidene, n is a number from 1 to 500, preferably from 10 to 400, especially preferably from 10 to 100, most preferably from 20 to 60, m is a number from 1 to 10, preferably from 1 to 6, especially preferably from 2 to 5, and p is 0 or 1, preferably 0;

and the value of n times m is preferably between 12 and 400, more preferably between 15 and 200;

is reacted with at least one polycarbonate in the presence of an organic or inorganic salt of a weak acid having a $pK_A$ value within the range of from 3 to 7 (25° C.).

"$C_1$-$C_4$-alkyl" in the context of the invention is, for example, methyl, ethyl, n-propyl, isopropyl, n-butyl, sec-butyl, tert-butyl; "$C_1$-$C_6$-alkyl" is additionally, for example, n-pentyl, 1-methylbutyl, 2-m ethylbutyl, 3-methylbutyl, neopentyl, 1-ethyl propyl cyclohexyl, cyclopentyl, n-hexyl, 1,1-dimethylpropyl, 1,2-dimethylpropyl, 1-methylpentyl, 2-methylpentyl, 3-methylpentyl, 4-methyl pentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl; "$C_1$-$C_{10}$-alkyl" is additionally, for example, n-heptyl and n-octyl, pinacyl, adamantyl, the isomeric menthyls, n-nonyl, n-decyl; $C_1$-$C_{34}$-alkyl is additionally for example, n-dodecyl, n-tridecyl, n-tetradecyl, n-hexadecyl or n-octadecyl. The same applies to the corresponding alkyl radical, for example, in aralkyl or alkylaryl, alkylphenyl or alkylcarbonyl radicals. Alkylene radicals in the corresponding hydroxyalkyl or aralkyl or alkylaryl radicals are, for example, alkylene radicals corresponding to the above alkyl radicals.

"Aryl" is a carbocyclic aromatic radical having 6 to 34 skeletal carbon atoms. The same applies to the aromatic moiety of an arylalkyl radical, also called aralkyl radical, and to aryl constituents of more complex groups, for example arylcarbonyl radicals.

Examples of "$C_6$-$C_{34}$-aryl" are phenyl, o-, p-, m-tolyl, naphthyl, phenanthrenyl, anthracenyl or fluorenyl.

"Arylalkyl" or "aralkyl" is in each case independently a straight-chain, cyclic, branched or unbranched alkyl radical as defined above, which may be singly, multiply or fully substituted by aryl radicals as defined above.

The above enumerations should be understood by way of example and not as a limitation.

In the context of the present invention, ppm and ppb—unless stated otherwise—are understood to mean parts by weight.

Polycarbonates in the context of the present invention are both homopolycarbonates and copolycarbonates.

The polycarbonates for use in accordance with the invention, including the polyestercarbonates, can be prepared by the known interfacial process with phosgene or by the known melt transesterification process.

Some, preferably up to 80 mol %, more preferably from 20 mol % up to 50 mol %, of the carbonate groups in the polycarbonates suitable in accordance with the invention may be replaced by aromatic dicarboxylic ester groups.

Such polycarbonates, which contain both acid radicals of the carbonic acid and acid radicals of aromatic dicarboxylic acids incorporated into the molecule chain, are, to be exact, aromatic polyestercarbonates. For the sake of simplicity, they are to be covered in the present application by the umbrella term of thermoplastic aromatic polycarbonates.

Polycarbonates are prepared in a known manner from diphenols, carbonic acid derivatives, optionally chain terminators and optionally branching agents, with replacement of a portion of the carbonic acid derivatives by aromatic dicarboxylic acids or derivatives of the dicarboxylic acids for preparation of the polyestercarbonates, specifically by aromatic dicarboxylic ester structural units according to the carbonate structural units to be replaced in the aromatic polycarbonates.

By way of example for the preparation of polycarbonates, reference is made here to Schnell, "Chemistry and Physics of Polycarbonates", Polymer Reviews, Volume 9, Interscience Publishers, New York, London, Sydney 1964.

Diphenols suitable for the process according to the invention for preparation of polycarbonates have been described many times in the prior art.

Suitable diphenols are, for example, hydroquinone, resorcinol, dihydroxydiphenyl, bis(hydroxyl-phenyl)alkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropyl-benzenes, and the alkylated, ring-alkylated and ring-halogenated compounds thereof.

Preferred diphenols are 4,4'-dihydroxydiphenyl, 2,2-bis(4-hydroxyphenyl)1-phenylpropane, 1,1-bis(4-hydroxyphenyl)phenylethane, 2,2-bis(4-hydroxyphenyl)propane, 2,4-bis(4-hydroxyphenyl)2-methylbutane, 1,3-bis[2-(4-hydroxyphenyl)2-propyl]benzene (bisphenol M), 2,2-bis(3-methyl-4-hydroxyphenyl)propane, bis(3,5-dimethyl-4-hydroxy-phenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)2-methylbutane and 1,3-bis[2-(3,5-dimethyl-4-hydroxyphenyl)2-propyl]benzene.

Particularly preferred diphenols are 4,4'-dihydroxydiphenyl, 1,1-bis(4-hydroxyphenyl)phenylethane and 2,2-bis(4-hydroxyphenyl)propane, 2,2-bis(3,5-dimethyl-4-hydroxyphenyl)propane. These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff.; p. 102 ff. and in D. G. Legrand, Bendler, Handbook of Polycarbonate Science and Technology, Marcel Dekker New York 2000, p. 72 ff.

In the case of the homopolycarbonates, only one diphenol is used; in the case of the copolycarbonates, a plurality of diphenols are used; it will be appreciated that the diphenols used, and also all the other chemicals and assistants added to the synthesis, may be contaminated with the impurities originating from their own synthesis, handling and storage, although it is desirable to work with raw materials of maximum cleanliness.

The diaryl carbonates suitable for the reaction with the dihydroxyaryl compounds in the melt transesterification are those of the general formula (2)

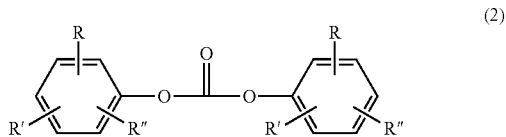

in which
R, R' and R" are the same or different and are each independently hydrogen, linear or branched $C_1$-$C_{34}$-alkyl, $C_7$-$C_{34}$-alkylaryl or $C_6$-$C_{34}$-aryl,
R may additionally also be —COO—R'" where R'" is hydrogen, linear or branched $C_1$-$C_{34}$-alkyl, $C_7$-$C_{34}$-alkylaryl or $C_5$-$C_{34}$-aryl.

Preferred diaryl carbonates are, for example, diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl)phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl-phenyl carbonate, di(biphenyl-4-yl) carbonate, 4-(1-methyl-1-phenylethyl)phenyl phenyl carbonate, di[4-(1-methyl-1-phenylethyl)phenyl] carbonate and di(methyl salicylate) carbonate.

Very particular preference is given to diphenyl carbonate. It is possible to use either one diaryl carbonate or else various diaryl carbonates.

The diaryl carbonates can also be used with residual contents of the monohydroxyaryl compounds from which they have been prepared. The residual contents of the monohydroxyaryl compounds may be up to 20% by weight, preferably up to 10% by weight, more preferably up to 5% by weight and most preferably up to 2% by weight.

The polycarbonates can be modified in a conscious and controlled manner by the use of small amounts of chain terminators and branching agents. Suitable chain terminators and branching agents are known from the literature. Some are described, for example, in DE-A 38 33 953. Preferably used chain terminators are phenol or alkylphenols, in particular phenol, p-tert-butylphenol, isooctylphenol, cumylphenol, the chlorocarbonic acid esters thereof or acid chlorides of monocarboxylic acids or mixtures of these chain terminators. Preferred chain terminators are phenol, cumylphenol, isooctylphenol and para-tert-butylphenol.

Examples of compounds suitable as branching agents are aromatic or aliphatic compounds having at least three, preferably three or four, hydroxyl groups. Particularly suitable examples having three or more than three phenolic hydroxyl groups are phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxy-phenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, tetra(4-hydroxy-phenyl)methane.

Examples of other trifunctional compounds suitable as branching agents are 2,4-dihydroxybenzoic acid, trimesic acid, cyanuric chloride and 3,3-bis(3-methyl-4-hydroxyphenyl)-2-oxo-2,3-dihydroindole.

Particularly preferred branching agents are 3,3-bis(3-methyl-4-hydroxyphenyl)-2-oxo-2,3-dihydroindole and 1,1,1-tri(4-hydroxyphenyl)ethane.

The catalysts used in the melt transesterification process for preparation of polycarbonates may be the basic catalysts known in the literature, for example alkali metal and alkaline earth metal hydroxides and oxides and/or onium salts, for example ammonium or phosphonium salts. Preference is given to using onium salts in the synthesis, more preferably phosphonium salts, Such phosphonium salts are, for example, those of the general formula (3)

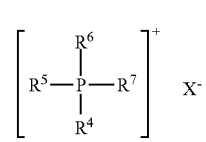

(3)

in which
$R^{4-7}$ are identical or different, optionally substituted $C_1$-$C_{10}$-alkyl, $C_6$-$C_{14}$-aryl, $C_7$-$C_{15}$-arylalkyl or $C_5$-$C_6$-cycloalkyl radicals, preferably methyl or $C_6$-$C_{14}$-aryl, more preferably methyl or phenyl, and
$X^-$ is an anion selected from the group of hydroxide, sulphate, hydrogensulphate, hydrogencarbonate, carbonate, halide, preferably chloride, and alkoxide or aroxide of the formula —$OR^8$ where $R^8$ is an optionally substituted $C_6$-$C_{14}$-aryl, $C_7$-$C_{15}$-arylalkyl, $C_5$-$C_6$-cycloalkyl or $C_1$-$C_{20}$-alkyl radical, preferably phenyl.

Particularly preferred catalysts are tetraphenylphosphonium chloride, tetraphenylphosphonium hydroxide and tetraphenylphosphonium phenoxide, very particular preference being given to tetraphenylphosphonium phenoxide.

The catalysts are used preferably in amounts of $10^{-8}$ to $10^{-3}$ mol, more preferably in amounts of $10^{-7}$ to $10^{-4}$ mol, based on one mole of dihydroxyaryl compound.

It is optionally also possible to use cocatalysts in order to increase the rate of polycondensation.

These may, for example, be alkaline salts of alkali metals and alkaline earth metals, such as hydroxides, optionally substituted $C_1$-$C_{10}$-alkoxides and $C_6$-$C_{14}$-aroxides of lithium, sodium and potassium, preferably hydroxides, optionally substituted $C_1$-$C_{10}$-alkoxides or $C_6$-$C_{14}$-aroxides of sodium. Preference is given to sodium hydroxide, sodium phenoxide or the disodium salt of 2,2-bis(4-hydroxyphenyl)propane.

If alkali metal or alkaline earth metal ions are supplied in the form of their salts, the amounts of alkali metal or alkaline earth metal ions, determined, for example, by atomic absorption spectroscopy, is 1 to 500 ppb, preferably 5 to 300 ppb and most preferably 5 to 200 ppb, based on polycarbonate to be formed. In preferred embodiments of the process according to the invention, however, no alkali metal salts are used.

The performance of the polycarbonate synthesis may be continuous or batchwise.

In a particular embodiment, polycarbonates having a water content of 0.01 to 0.40 and preferably 0.05 to 0.35% by weight are used.

Preferably, the polycarbonate has a weight-average molecular weight of 16 000 to 28 000 g/mol, preferably of 17 000 to 27 000 g/mol, and especially preferably of 18 000 to 26 500 g/mol, determined by means of gel permeation chromatography and BPA (bisphenol A) standard, and phenolic OH groups in an amount of 250 ppm to 1000 ppm, preferably 300 to 900 ppm and especially preferably of 350 to 800 ppm.

In a preferred embodiment, the polycarbonate has a relative solution viscosity (eta rel) of 1.16 to 1.30, preferably 1.17 to 1.28, and more preferably 1.18 to 1.27, determined in dichloromethane at a concentration of 5 g/l at 25° C. using a Ubbelohde viscosimeter.

The weight-average molecular weight of the siloxane component is preferably 3000 to 20 000 g/mol, determined by means of gel permeation chromatography and BPA (bisphenol A) Standard, and especially preferably 3500-15 000 g/mol.

Very particular preference is given to using, as the siloxane component, hydroxyaryl-terminated siloxanes of the formula (1) where the $R^2$ and $R^3$ radicals are both methyl and the $R^1$ radical is hydrogen, and p is 0.

The siloxanes of the formula (1) can be prepared by a process including the step of reacting a linear α,ω-bisacyloxy-polydialkylsiloxane of the general formula (4) with at least one aromatic compound having at least two phenolic hydroxy groups, wherein the general formula (4) is

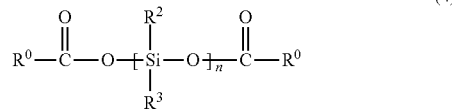

(4)

in which
$R^0$ is aryl, $C_1$ to $C_{10}$-alkyl or $C_1$ to $C_{10}$-alkylaryl,
$R^2$ and $R^3$ are the same or different and each independently from one another selected from aryl, $C_1$ to $C_{10}$-alkyl and $C_1$ to $C_{10}$-alkylaryl, preferably $R^2$ and $R^3$ are both methyl, and
n is a number from 1 to 500, preferably from 10 to 400, especially preferably from 10 to 100, most preferably from 20 to 60, and wherein the compound of formula (4) and the aromatic compound are reacted in such a molar ratio that the ratio of the phenolic hydroxyl groups in the aromatic compound to the acyloxy groups in the compound of formula (4) is less than 2.0.

In a particularly preferred embodiment, the aromatic compound having at least two phenolic hydroxy groups is a bisphenolic compound or a hydroxyl-functional oligomer thereof.

The preparation of the siloxane of formula (1) is preferably performed in an inert solvent, preferably selected from aromatic hydrocarbons such as toluene, xylenes, chlorobenzene and the like, and polar organic acids, such as acetic acid and other C3 to C6 organic carboxylic acids. The reaction can be performed in the presence of a catalyst, which is preferably selected from the metal salts of organic acids, such as sodium or potassium acetate. Other catalysts known in the art to catalysed siloxane condensation reactions can also be used.

In the process according to the invention, the siloxane component of the formula (1) is used preferably in an amount of 0.5 to 50% by weight, more preferably of 1 to 40% by weight, especially preferably of 2 to 20%, most preferably of 2.5 to 10% by weight, and in particular 2.5% by weight to 7.5% by weight, based in each case on the polycarbonate used.

In the process according to the invention, the siloxane component of the formula (1) is reacted with at least one polycarbonate in the presence of an organic or inorganic salt of a weak acid having a $pK_A$ value within the range of from 3 to 7 (25° C.). Suitable weak acids include carboxylic acids, preferably $C_2$-$C_{22}$ carboxylic acids, such as acetic acid, propionic acid, oleic acid, stearic acid, lauric acid, benzoic acid, 4-methoxybenzoic acid, 3-methylbenzoic acid, 4-tert-butylbenzoic acid, p-tolylacetic acid, 4-hydroxybenzoic acid and salicylic acid, partial esters of polycarboxylic acids, such as monoesters of succinic acid, partial esters of phosphoric acids, such as mono- or diorgano phosphoric acid esters, branched aliphatic carboxylic acids, such as 2,2-dimethylpropanoic acid, 2,2-dimethylbutanoic acid, 2,2-dimethylpentanoic acid and 2-ethylhexanoic acid.

Preferably, the organic or inorganic salt is selected from the group consisting of alkali metal salts, earth alkaline metal salts, quaternary ammonium salts and quaternary phosphonium salts. Useful quaternary ammonium salts are selected from tetra-(n-butyl)-ammonium, tetraphenylammonium, tetrabenzylammonium and cetyltrimethylammonium salts. Useful quaternary phosphonium salts are selected from tetra-(n-butyl)-phosphonium, tetraphenylphosphonium, tetrabenzylphosphonium and cetyltrimethylphosphonium salts. Especially preferred are alkali metal salts and earth alkaline metal salts.

Useful organic and inorganic salts are or are derived from sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium oleate, lithium oleate, potassium oleate, sodium benzoate, potassium benzoate, lithium benzoate, disodium, dipotassium and dilithium salts of bisphenol A. Furthermore the salts may include calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the respective oleates. These salts may be used singly or in combination.

In a particular preferred embodiment, the salt is selected from the group consisting of alkali metal salts and phosphonium salts of carboxylic acids.

In a preferred embodiment, the organic or inorganic salt is derived from a carboxylic acid.

The organic or inorganic salts are used preferably in amounts of 0.5 to 1000 ppm, more preferably 1 to 100 ppm, and most preferably 1 to 10 ppm, based on the total weight of the siloxane and the organic or inorganic salt. Preferably, the organic or inorganic salts are used in amounts of 0.0005 to 5 mmol/kg, more preferably 0.001 to 1 mmol/kg, and most preferably 0.001 to 0.5 mmol/kg, based on the total weight of the siloxane, the polycarbonate and the organic or inorganic salt.

In a preferred embodiment, the organic or inorganic salt is a sodium salt, preferably a sodium salt of a carboxylic acid and is preferably used in such an amount that the sodium content in the siloxane is within the range of from 0.5 ppm to 100 ppm, preferably 0.8 to 50 ppm, more preferably 1.0 to 10 ppm and in particular 1.3 to 5 ppm, based on the total weight of the polysiloxane-polycarbonate block cocondensate to be formed. The sodium content of the cocondensate can be determined, for example, by atomic absorption spectroscopy with flame atomization.

Preferably, the sodium salt is used in such an amount that the Sodium content in the resulting polysiloxane-polycarbonate block cocondensate is at least 50 ppb, preferably at least 80 ppb, more preferably at least 100 ppb, and in particular at least 150 ppb, based on the total weight of the polysiloxane-polycarbonate block cocondensate to be formed.

In a preferred embodiment, the organic or inorganic salt is a sodium salt, preferably a sodium salt of a carboxylic acid and is preferably used in such an amount that the sodium content in the resulting polysiloxane-polycarbonate block cocondensate is within the range of from 0.1 ppm to 1000 ppm, preferably 0.2 to 100 ppm, more preferably 0.3 to 10 ppm and in particular 0.4 to 5 ppm, based on the total weight of the polysiloxane-polycarbonate block cocondensate to be formed. The sodium content of the cocondensate can be determined, for example, by atomic absorption spectroscopy with flame atomization.

The organic or inorganic salt can be used alone or as a mixture and be added in substance or as a solution. In a preferred embodiment, the inorganic or organic salt is added in form of mixture containing the siloxane and the organic or inorganic salt. Preferably, the mixture is obtained by mixing the siloxane and the organic or inorganic salt and optionally one or more polar organic compounds having up to 30, preferably up to 20 carbon atoms, and at least one heteroatom, preferably selected from O, N and S, and optionally heating the mixture, for example to a temperature of 50° C. to 300° C., until it becomes clear and then cooling to room temperature. The polar organic compound can be removed before adding the mixture to the polycarbonate or thereafter, preferably by distillation.

Suitable polar organic compounds are selected from the group consisting of organic ketones, esters and alcohols. Alcohols, especially primary alcohols having up to 20 carbon atoms, such as 1-octanol, 1-decanol, 2-ethylhexanol, 1-dodecanol, 1,2-octanediol, benzyl alcohol, ethylhexylglycerin and oleoyl alcohol are particularly preferred. Preferably, the polar organic compound has a boiling point of less than 300° C. (at 1.013 bar).

Through the process according to the invention, the corresponding block cocondensates are obtainable within short reaction times. "Short reaction time" in this context means the reaction time which is required to condensate the low molecular weight polycarbonate (from a molten state) to the block cocondensate having the target viscosity and having incorporated the siloxane component. The reaction time is preferably less than one hour, especially preferably less than 50 minutes and most preferably less than 40 minutes. Especially preferably, the block copolymer is prepared in a process having fewer than 3 stages, especially preferably having fewer than two stages, not counting the melting and mixing of reactants and any catalysts as a stage.

Individual stages mean, for example, the conduction of the reaction at particular temperatures and pressures (for example one stage at 200° C. and 100 mbar, a second stage at 50 mbar and 250° C., and a third stage at 10 mbar and 300° C., each with particular residence times).

Preference is given to reacting the polycarbonate and the siloxane by means of catalysts. In this embodiment, the organic or inorganic salt acts as a co-catalyst.

It is also possible in principle to conduct the reaction without catalyst, but in that case it may be necessary to accept higher temperatures and longer residence times.

Catalysts suitable for the process according to the invention are, for example, tetra alkyl ammonium catalysts, for example tetramethylammonium hydroxide, tetramethylammonium acetate, tetramethylammonium fluoride, tetramethylammonium tetraphenylboranate, dimethyldiphenylammonium hydroxide, tetraethylammonium hydroxide, cetyltrimethylammonium tetraphenylboranate and cetyltrimethylammonium phenoxide.

Especially suitable catalysts are phosphonium catalysts of the formula (5):

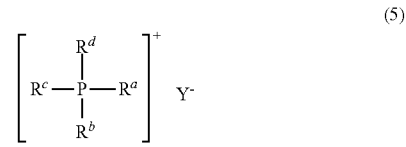

(5)

where $R^a$, $R^b$, $R^c$ and $R^d$ may be identical or different $C_1$-$C_{10}$-alkyls, $C_6$-$C_{14}$-aryls, $C_7$-$C_{15}$-arylalkyls or $C_5$-$C_6$-cycloalkyls, preferably methyl or $C_6$-$C_{14}$-aryls, more preferably methyl or phenyl, and $Y^-$ may be an anion such as hydroxide, sulphate, hydrogensulphate, hydrogencarbonate, carbonate or a halide, preferably chloride, or an alkoxide or aroxide of the formula —$OR^e$ where $R^e$ may be a $C_6$-$C_{14}$-aryl, $C_7$-$C_{15}$-arylalkyl or $C_5$-$C_6$-cycloalkyl, preferably phenyl.

Particularly preferred catalysts are tetraphenylphosphonium chloride, tetraphenylphosphonium hydroxide and tetraphenylphosphonium phenoxide; very particular preference is given to tetraphenylphosphonium phenoxide.

The catalyst is used preferably in amounts of 0.0001 to 1.0% by weight, preferably from 0.001 to 0.5% by weight, especially preferably from 0.005 to 0.3% by weight and most preferably from 0.01 to 0.15% by weight, based on the overall composition.

The catalyst can be used alone or as a catalyst mixture and be added in substance or as a solution, for example in water or in phenol (for example as a cocrystal with phenol).

Catalysts suitable for the process according to the invention are those mentioned above, which are introduced into the reaction either by means of a masterbatch with a suitable polycarbonate, especially the above-described inventive polycarbonate, or can be added separately therefrom or in addition thereto.

The catalysts can be used alone or in a mixture and be added in substance or as a solution, for example in water or in phenol.

The process for preparing the block copolycarbonates can be performed continuously or batchwise, for example in stirred tanks, thin-film evaporators, stirred tank cascades, extruders, kneaders and simple disc reactors. The feedstocks may be blended together and melted from the start. In addition, the feedstocks may also be added separately from one another. For instance, the polycarbonate for use in accordance with the invention can first be melted and the siloxane component for use in accordance with the invention can be added at a later time. This can be done, for example, by means of liquid metering with an appropriate pump or via granules sprinkled on to polycarbonate.

The organic or inorganic salt and the optionally present catalyst can independently of one another be added at any time, preferably at the start of the reaction, in free form or in the form of a masterbatch.

In a preferred embodiment, the reaction is performed in the melt at temperatures of 280° C. to 400° C., preferably of 300° C. to 390° C., more preferably of 320° C. to 380° C. and most preferably of 330° C. to 370° C., and pressures of 0.001 mbar to 50 mbar, preferably 0.005 mbar to 40 mbar, especially preferably 0.02 to 30 mbar, and most preferably 0.03 to 5 mbar.

Preference is given to shearing the reaction mixture. This can be done by rapid stirring in a tank or by means of appropriate mixing elements such as static mixers, mixing elements on an extruder screw etc. Higher mixing is preferable over low mixing. The reaction is preferably conducted in such a way that low molecular weight constituents such as water, phenol, linear and cyclic low molecular weight siloxane, diphenyl carbonate, bisphenol A and bisphenol A oligomers (oligocarbonates) are removed effectively.

In a preferred embodiment, the reactants are melted under reduced pressure. According to the plant construction, during the melting phase, atmospheric pressure, preferably gentle vacuum; i.e. absolute pressures of lower than 200 mbar, especially preferably 100-200 mbar and most preferably less than 100 mbar can be applied. However, the reactants can also be melted under standard pressure, preferably under protective gas atmosphere, for example nitrogen. The melting is preferably effected at a temperature in the range from 250 to 400° C., more preferably in the range from 280 to 380° C., most preferably in the range from 300 to 360° C. For the reaction or condensation phase, the temperatures and pressures mentioned above apply.

Preferably, the polysiloxane-polycarbonate block cocondensate obtainable by the process according to the invention has a relative solution viscosity of 1.26 to 1.40, more preferably of 1.27 to 1.38, and especially preferably of 1.28 to 1.35, determined in dichloromethane at a concentration of 5 g/l at 25° C. using a Ubbelohde viscosimeter. Preferably, the polysiloxane-polycarbonate block cocondensate obtainable by the process according to the invention has a weight average molecular weight of 26,000 to 40,000 g/mol, more preferably 27,000 to 38,000 g/mol, and most preferably 28,000 to 35,000 g/mol, determined by measuring the relative solution viscosity in dichloromethane at a concentration of 5 g/l at 25° C. using a Ubbelohde viscosimeter. Granules are obtained, if possible, by direct spinning of the melt and subsequent granulation, or else through use of discharge extruders or gear pumps, by which spinning is effected in air or under liquid, usually water. If extruders are utilized, additives can be added to the melt upstream of this extruder, optionally with use of static mixers or by means of side extruders in the extruder.

It is possible to add additives and/or fillers and reinforcers to the polysiloxane-polycarbonate block cocondensates obtainable by the process according to the invention in amounts of 0% by weight to 5.0% by weight, more preferably 0% by weight to 2.0% by weight, and most preferably 0% by weight to 1% by weight. The additives are standard polymer additives, for example the following which are described in EP-A 0 839 623, WO-A 96/15102, EP A 0 500 496 or "Plastics Additives Handbook", Hans Zweifel, 5th Edition 2000, Hanser Verlag, Munich: flame retardants, UV stabilizers, gamma stabilizers, antistats, optical brighteners, flow improvers, thermal stabilizers, inorganic pigments, demoulding agents or processing aids. Fillers and/or reinforcers can be used in amounts of 0% by weight to 50% by weight, preferably 0% by weight to 20% by weight, more preferably 0% by weight to 12% by weight, and in particular 0% by weight to 9% by weight.

These additives, fillers and/or reinforcers can be added to the polymer melt individually or in any desired mixtures or a plurality of different mixtures, and additives can specifically be supplied directly in the course of insulation of the polymer (for example via a side unit such as a side extruder) as a pure substance or as a masterbatch in polycarbonate, or else after melting of granules in a compounding step. The additives or mixtures thereof can be added to the polymer melt in solid form, i.e. as a powder, or as a melt. Another method of metered addition is the use of masterbatches or mixtures of masterbatches of the additives or additive mixtures.

In a preferred embodiment, the polymer composition comprises thermal stabilizers or processing stabilizers. Preferentially suitable are phosphites and phosphonites, and also phosphines. Examples are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis (2,4-di-tert-butylphenyl) pentaerythrityl diphosphite, bis(2, 4-di-cumylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4, 6-tris(tert-butylphenyl)) pentaerythrityl diphosphite, tristearylsorbitol triphosphite, tetrakis(2,4-di-tert-butylphenyl)4,4'-biphenylene diphosphonite, 6-isooctyloxy-2,4,8,10-tetra-tert-butyl-12H-dibenzo[d,g]-1,3,2-dioxaphosphocin, bis(2,4-di-tert-butyl-6-methylphenyl) methyl phosphite, bis (2,4-di-tert-butyl-6-methylphenyl) ethyl phosphite, 6-fluoro-2,4,8,10-tetra-tert-butyl-12-methyldibenzo[d,g]-1, 3,2-dioxaphosphocin, 2,2',2''-nitrilo-[triethyl tris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl) pentaerythrityl diphosphite, triphenylphosphine (TPP), trialkylphenylphosphine, bisdiphenylphosphinoethane or a trinaphthylphosphine. Especially preferred are triphenylphosphine (TPP), Irgafos® 168 (tris(2,4-di-tert-butylphenyl) phosphite) and tris(nonylphenyl) phosphite, or mixtures thereof.

It is additionally possible to use phenolic antioxidants such as alkylated monophenols, alkylated thioalkylphenols, hydroquinones and alkylated hydroquinones. Particular preference is given to using Irganox 1010 (pentaerythrityl 3-(4-hydroxy-3,5-di-tert-butylphenyl)propionate; CAS: 6683-19-8) and Irganox 10768 (2,6-di-tert-butyl-4-(octadecanoxycarbonylethyl)phenol).

Suitable UV absorbers are described, for example, in EP 1 308 084 A1, in DE 102007011069 A1, and in DE 10311063 A1.

Particularly suitable ultraviolet absorbers are hydroxybenzotriazols such as 2-(3',5'-bis(1,1-dimethylbenzyl)2'-hydroxyphenyl)benzotriazole (Tinuvin® 234, BASF SE, Ludwigshafen), 2-(2'-hydroxy-5'-(tert-octyl)phenyl) benzotriazole (Tinuvin® 329, BASF SE, Ludwigshafen), 2-(2'-hydroxy-3'-(2-butyl)5'-(tert-butyl)phenyl)benzotriazole (Tinuvin® 350, BASF SE, Ludwigshafen), bis(3-(2H-benztriazolyl)2-hydroxy-5-tert-octyl)methane, (Tinuvin® 360, BASF SE, Ludwigshafen), 2-(4,6-diphenyl-1,3,5-triazin-2-yl)5-(hexyloxy)phenol (Tinuvin® 1577, BASF SE, Ludwigshafen), and the benzophenones 2,4-dihydroxybenzophenone (Chimasorb® 22, BASF SE, Ludwigshafen) and 2-hydroxy-4-(octyloxy)benzophenone (Chimassorb® 81, BASF SE, Ludwigshafen), 2-cyano-3,3-diphenyl-2-propenoic acid, 2,2-bis[[(2-cyano-1-oxo-3,3-diphenyl-2-propenyl)oxy]methyl]1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1.3,5-triazine (Tinuvin® 1600, BASF SE, Ludwigshafen) or tetra ethyl-2,2'-(1,4-phenylenedimethylidene)bismalonate (Hostavin® B-Cap, Clariant AG).

It is also possible to use mixtures of these ultraviolet absorbers.

The polymer compositions may optionally comprise demoulding agents. Particularly suitable demoulding agents for the inventive composition are pentaerythrityl tetrastearate (PETS) or glyceryl monostearate (GMS).

In addition, it is also possible to add other polymers to the block cocondensates obtainable in accordance with the invention, for example polycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate, for example poly- or copolymethylmethacrylates (such as PMMA), and copolymers with styrene, for example transparent polystyrene-acrylonitrile (PSAN), rubber-modified vinyl (co-)polymers, such as acrylonitrile butadiene styrene copolymer, thermoplastic polyurethanes, polymers based on cyclic olefins (e.g. TOPAS®, a commercial product from Ticona).

The block cocondensates obtainable by the process according to the invention can be processed in a manner known for thermoplastic polycarbonates to give any desired mouldings.

In this context, the inventive compositions can be converted, for example, by hot pressing, spinning, blow-moulding, thermoforming, extrusion or injection moulding to products, mouldings or shaped articles. Also of interest is the use of multilayer systems. The application may coincide with or immediately follow the shaping of the base structure, for example by coextrusion or multicomponent injection moulding. However, application may also be on to the ready-shaped base structure, for example by lamination with a film or by coating with a solution.

Sheets or mouldings composed of base layer and optional top layer/optional top layers (multilayer systems) can be produced by (co)extrusion, direct skinning, direct coating, insert moulding, film insert moulding, or other suitable processes known to those skilled in the art.

Injection moulding processes are known to those skilled in the art and are described, for example, in "Handbuch Spritzgiessen", Friedrich Johannnaber/Walter Michaeli, Munich; Vienna: Hanser, 2001. ISBN 3-446-15632-1 or "Anleitung zum Bau von Spritzgiesswericzetigen", Menges/Michaeli/Mohren, Munich; Vienna: Hanser, 1999, ISBN 3-446-21258-2.

Extrusion processes are known to those skilled in the art and are described, for example, for coextrusion, inter alia, in EP-A 0 110 221, EP-A 0 110 238 and EP-A 0 716 919. For details of the adapter and nozzle process, see Johannaber/Ast: "Kunststoff-Maschinenführer", Hanser Verlag, 2000 and in Gesellschaft Kunststofftechnik: "Coextrudierte Mien and Platten: Zukunftsperspektiven, Anforderungen, Anlagen and Herstellung, Qualitätssicherung", VDI-Verlag, 1990.

The polysiloxane-polycarbonate block cocondensates obtainable by the process according to the invention are usable wherever the known aromatic polycarbonates have been used to date, and wherever good flowability coupled with improved demoulding characteristics and high toughness at low temperatures and improved chemical resistance are additionally required, for example for production of large external motor vehicle parts and switch boxes for exterior use, and of sheets, cavity sheets, electric and electronic parts, and optical memory. For example, the block cocondensates can be used in the IT sector for computer housings and multimedia housings, mobile phone cases, and in the domestic sector, such as in washing machines, and in the sports sector, for example as a material for helmets.

The invention further relates to a polysiloxane-polycarbonate block cocondensate derived from
(A) at least one hydroxyaryl-terminated siloxane of the formula (1) (siloxane component)

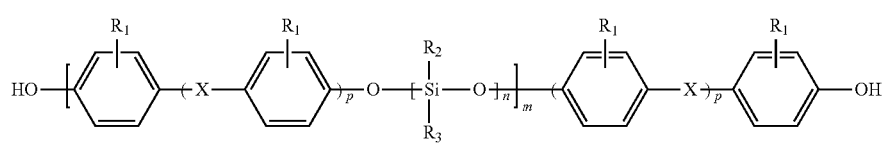

in which
$R^1$ is H, Cl, Br or $C_1$ to $C_4$-alkyl,
$R^2$ and $R^3$ are the same or different and each independently from one another selected from aryl, $C_1$ to $C_{10}$-alkyl and $C_1$ to $C_{10}$-alkylaryl,
X is a single bond, —CO—, —O—, $C_1$- to $C_6$-alkylene, $C_2$ to $C_5$-alkylidene, $C_5$ to $C_{12}$-cycloalkylidene or $C_6$ to $C_{12}$-arylene which may optionally be fused to further aromatic rings containing heteroatoms,
n is a number from 1 to 500,
m is a number from 1 to 10, and
p is 0 or 1, preferably 0; and
(B) at least one polycarbonate,
which polysiloxane-polycarbonate block cocondensate has a sodium content within the range of from 0.1 ppm to 1000 ppm. The preferred embodiments related to the siloxane of the formula (I), the polycarbonate and the sodium content as described above with regard to the process according to the invention and the polysiloxane-polycarbonate block cocondensate obtained by the process according to the invention also apply to the aforementioned polysiloxane-polycarbonate block cocondensate.

The invention further relates to a polysiloxane-polycarbonate block cocondensate derived from
(A) at least one hydroxyaryl-terminated siloxane of the formula (1) (siloxane component)

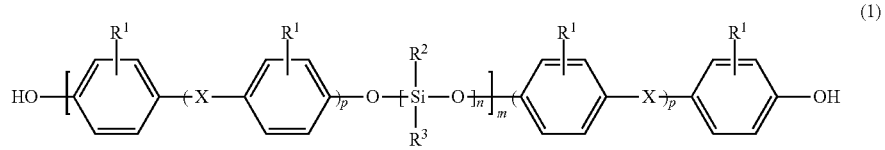

(1)

in which

R¹ is H, Cl, Br or $C_1$ to $C_4$-alkyl,

R² and R³ are the same or different and each independently from one another selected from aryl, $C_1$ to $C_{10}$-alkyl and $C_1$ to $C_{10}$-alkylaryl, X is a single bond, —CO—, —O—, $C_1$- to $C_6$-alkylene, $C_2$ to $C_5$-alkylidene, $C_5$ to $C_{12}$-cycloalkylidene or $C_6$ to $C_{12}$-arylene which may optionally be fused to further aromatic rings containing heteroatoms, n is a number from 1 to 500, m is a number from 1 to 10, and p is 0 or 1, preferably 0; and (B) at least one polycarbonate, which polysiloxane-polycarbonate block cocondensate comprises at least one organic or inorganic salt of a weak acid having a $pK_A$ value within the range of from 3 to 7 (25° C.) in amounts of 0.0005 to 5 mmol/kg, based on the total weight of the polysiloxane-polycarbonate block cocondensate. The preferred embodiments related to the siloxane of the formula (I), the polycarbonate and the organic or inorganic salt as described above with regard to the process according to the invention and the polysiloxane-polycarbonate block cocondensate obtained by the process according to the invention also apply to the aforementioned polysiloxane-polycarbonate block cocondensate.

EXAMPLES

The invention is described in detail hereinafter by working examples, the determination methods described here being employed for all corresponding parameters in the present invention, in the absence of any descriptions to the contrary.

Determination of Melt Volume Flow Rate (MVR):

The melt volume flow rate (MVR) is determined to ISO 1133 (at 300° C.; 1.2 kg), unless any other conditions have been described.

Determination of Solution Viscosity (eta rel):

The relative solution viscosity ($\eta_{rel}$; also referred to as eta rel) was determined in dichloromethane at a concentration of 5 g/l at 25° C. with an Ubbelohde viscometer.

Materials Used:

PC 1: linear bisphenol A polycarbonate having end groups based on phenol with a solution viscosity of 1.205 and a melt volume flow rate MVR of 59 cm³/10 min (measured at 300° C. and load 1.2 kg to ISO 1033). This polycarbonate does not contain any additives such as UV stabilizers, demoulding agents or thermal stabilizers. The polycarbonate was prepared by means of a melt transesterification process as described in DE 102008019503.

Siloxane Component:

The siloxane used is hydroquinone-terminated polydimethylsiloxane of the formula (1) (i.e. R¹=H, R², R³=methyl, p=0), in which n=33.7 and m=3.7, having a hydroxy content of 11.9 mg KOH/g and a viscosity of 358 mPa·s (23° C.).

The weight-average molecular weight is Mw=9100 g/mol, determined by means of gel permeation chromatography (GPC) with bisphenol A standard; detection was effected by means of an IR detector at 1050 cm⁻¹.

The siloxane component can be prepared according to the following procedure:

In a reaction flask equipped with a thermostat heater; stirrer, thermometer, and reflux condenser, 250 g of an α,ω-bisacyloxypolydimethylsiloxane, with an average chain length of 31.8 dimethylsiloxy units as determined by ²⁹Si NMR and 230 mmoles of acyloxy terminal groups, is added dropwise over 4 hours to a solution of 35.1 g (150 mmoles) bisphenol-A in 50 g xylenes, 25 g acetic acid and 0.5 g of sodium acetate, while heating to a mild reflux at 105° C. After complete addition the clear solution is stirred for an additional hour. Then the solvents and volatiles are removed by vacuum distillation to 160° C. and 3 mbar pressure. After cooling the crude product is filtered over a 3 micron filter (Seitz K300) to give 236 g (83% theory) of a clear, colorless liquid.

Catalyst:

The catalyst used is tetraphenylphosphonium phenoxide from Rhein Chemie Rheinau GmbH (Mannheim, Germany). The substance is used in the form of a cocrystal with phenol and contains about 70% tetraphenylphosphonium phenoxide. The amounts which follow are based on the substance obtained from Rhein Chemie (as a cocrystal with phenol).

Example 1 (Comparative Example)

47.5 g of polycarbonate granules (PC 1), 2.5 g of siloxane (5% by weight; without co-catalyst; sodium content of the siloxane about 0.1 ppm) and 0.071 g of tetraphenylphosphonium phenoxide cocrystal (0.1% by weight) are weighed into a 250 ml glass flask with stirrer and short-path separator. The apparatus is evacuated and vented with nitrogen (3× each). The mixture is melted by means of a metal bath preheated at 350° C. under reduced pressure (1.5 mbar) within 10 minutes. The reaction mixture is kept at this reduced pressure while stirring for 30 minutes. This is followed by venting with nitrogen and removal of the polymer melt. This gives an opaque white powder. The solution viscosity is reported in table 1.

Example 2 (Comparative Example)

The cocondensate is prepared as described in Example 1. In a departure from Example 1, the condensation phase under stirring is only 10 minutes (instead of 30 minutes). The pressure during the condensation phase is 1.5 mbar. This gives an opaque white powder. The solution viscosity is reported in table 1.

Example 3 (Inventive)

The cocondensate is prepared as described in Example 1. In deviation from example 1 the siloxane contains sodium acetate as a co-catalyst. The sodium content in the siloxane is 1.3 ppm. The solution viscosity is reported in table 1.

Example 4 (Inventive)

The cocondensate is prepared as described in Example 3. In a departure from Example 3, the condensation phase under stirring is only 10 minutes (instead of 30 minutes). The pressure during the condensation phase is 1.5 mbar. This gives an opaque white powder. The solution viscosity is reported in table 1.

TABLE 1

|  | Example 1 (comparative) | Example 2 (comparative) | Example 3 (inventive) | Example 4 (inventive) |
| --- | --- | --- | --- | --- |
| Used polycarbonate | PC 1 | PC 1 | PC 1 | PC 1 |
| Added salt | — | — | Sodium acetate | Sodium acetate |
| Na-content in the siloxane | 0.1 ppm[1)] | 0.1 ppm[1)] | 1.3 ppm | 1.3 ppm |
| Time of condensation phase | 30 min | 10 min | 30 min | 10 min |
| Solution viscosity of product | 1.305 | 1.228 | 1.315 | 1.261 |

[1)]The Na-content results from the preparation process of the siloxane.

As can be seen from table 1, the solution viscosity of the copolymer after 30 minutes of condensation is similar. However, the solution viscosity after 10 minutes is significantly higher for the material containing sodium acetate. It was surprising that sodium acetate could speed up the molecular weight increase in the beginning of the condensation phase while having a limited effect after prolonged condensation time.

The invention claimed is:

1. A process for preparing polysiloxane-polycarbonate block cocondensates, comprising reacting at least one hydroxyaryl-terminated siloxane of the formula (1)

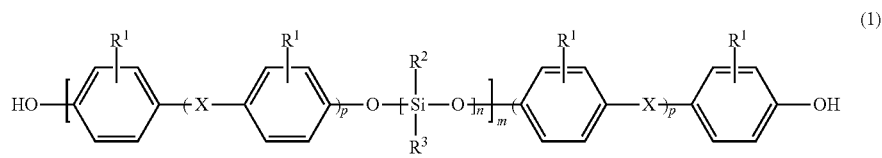

in which
R$^1$ is H, Cl, Br or C$_1$ to C$_4$-alkyl,
R$^2$ and R$^3$ are the same or different and each independently from one another selected from is aryl, C$_1$ to C$_{10}$-alkyl and C$_1$ to C$_{10}$-alkylaryl,
X is a single bond, —CO—, —O—, C$_1$ to C$_6$-alkylene, C$_2$ to C$_5$-alkylidene, C$_5$ to C$_{12}$-cycloalkylidene or C$_6$ to C$_{12}$-arylene which may optionally be fused to further aromatic rings containing heteroatoms,
n is a number from 10 to 100,
m is a number from 2 to 5, and
p is 0 or 1;
with at least one polycarbonate in the presence of an organic or inorganic sodium salt of a weak acid having a pK$_A$ value within the range of from 3 to 7 (25° C.) and polysiloxane-polycarbonate block cocondensate has a sodium content within the range of from 0.5 ppm to 100 ppm.

2. The process according to claim 1, wherein the organic or inorganic salt is selected from the group consisting of alkali metal salts, earth alkaline metal salts, quaternary ammonium salts and quaternary phosphonium salts.

3. The process according to claim 1, wherein the salt is derived from a carboxylic acid.

4. The process according to claim 1, wherein the organic or inorganic salt is used in an amount of 0.5 to 1000 ppm, based on the total weight of the siloxane and the organic or inorganic salt.

5. The process according to claim 1, wherein the hydroxyaryl-terminated siloxane has a weight-average molecular weight of 3000-20 000 g/mol.

6. The process according to claim 1, wherein the hydroxyaryl-terminated siloxane is used in an amount of 2 to 20% by weight, based on the polycarbonate used.

7. The process according to claim 1, wherein R$^1$ is H, p is 1 and X is isopropylidene.

8. The process according to claim 1, wherein R$^2$ and R$^3$ are methyl.

9. The process according to claim 1, wherein a phosphonium catalyst of the formula of the formula (5) is used during the reaction:

$$\left[ \begin{array}{c} R^d \\ R^c-P-R^a \\ R^b \end{array} \right]^+ Y^- \quad (5)$$

where
R$^a$, R$^b$, R$^c$ and R$^d$ may be identical or different C$_1$-C$_{10}$-alkyls, C$_6$-C$_{14}$-aryls, C$_7$-C$_{15}$-arylalkyls or C$_5$-C$_6$-cycloalkyls, and
Y— may be an anion selected from the group consisting of hydroxide, sulphate, hydrogensulphate, hydrogencarbonate, carbonate, halide or an alkoxide or aroxide of the formula —OR$^e$ where R$^e$ is C$_6$-C$_{14}$-aryl, C$_7$-C$_{15}$-arylalkyl or C$_5$-C$_6$-cycloalkyl.

10. The process according to claim 1, wherein it is performed in the melt.

11. The process according to claim 1, wherein the process is performed at temperatures of 280° C. to 400° C. and pressures of 0.001 mbar to 50 mbar.

12. The process according to claim 1, wherein the polysiloxane-polycarbonate block cocondensate has a sodium content within the range of from 1.3 ppm to 5 ppm.

* * * * *